United States Patent [19]

Hines et al.

[11] Patent Number: 5,225,377

[45] Date of Patent: Jul. 6, 1993

[54] METHOD FOR MICROMACHINING SEMICONDUCTOR MATERIAL

[75] Inventors: John R. Hines, Richardson; Ralph H. Johnson, Plano; Richard Kirkpatrick, Richardson, all of Tex.

[73] Assignee: Honeywell Inc., Minneapolis, Minn.

[21] Appl. No.: 695,185

[22] Filed: May 3, 1991

[51] Int. Cl.$^5$ .............................. H01L 21/306
[52] U.S. Cl. ..................... 437/228; 437/901
[58] Field of Search ............ 437/63, 72, 225, 228, 437/901

[56] References Cited

U.S. PATENT DOCUMENTS

| | | | |
|---|---|---|---|
| 3,767,494 | 10/1973 | Muraoka et al. | 437/228 |
| 4,665,610 | 5/1987 | Barth | 437/901 |
| 4,840,920 | 6/1989 | Suda | 437/72 |
| 5,006,476 | 4/1991 | DeJong et al. | 437/63 |
| 5,059,556 | 10/1991 | Wilcoxen | 437/901 |

FOREIGN PATENT DOCUMENTS

| | | | |
|---|---|---|---|
| 62-61374 | 3/1987 | Japan | 437/901 |
| 63-222463 | 9/1988 | Japan | 437/901 |
| 2-254763 | 10/1990 | Japan | 437/901 |
| 2-281760 | 11/1990 | Japan | 437/225 |
| 2151398 | 7/1985 | United Kingdom | 437/901 |

Primary Examiner—Olik Chaudhuri
Assistant Examiner—Ourmazd S. Ojan
Attorney, Agent, or Firm—Robert B. Leonard

[57] ABSTRACT

A structure is formed from two layers of material having opposite conductivity types. A first region is formed within the structure, and extends at least in part into a layer to be etched. A surface of the structure is then masked and etched. The result is a microstructure which varies with the conductivity type and geometry of the region formed and etchant used.

8 Claims, 9 Drawing Sheets

METHOD FOR MICROMACHINING SEMICONDUCTOR MATERIAL

BACKGROUND OF THE INVENTION

This invention is directed toward the field of semiconductor microstructures.

As an example, one method of construction of semiconductor devices involved the formation of an epitaxial layer of N type silicon on a first layer of P type silicon. In one case, a portion of the first layer was then etched away, leaving a support rim and a diaphragm which formed a pressure transducer. Another possible construction involved formation of a cantilever beam from the N type layer which acted as an accelerometer.

In order to improve the linearity and accuracy of these devices, it was desirable to attach bosses to the diaphragm of the pressure transducer or the cantilever beam of the accelerometer. A problem existed in that the boss thicknesses could not be tightly controlled since the bosses were formed by using a bottom side etch or a top and bottom etch. Another problem existed in that one or more dimensions of the boss needed to be as small as possible to reduce parasitic effects in the structure. The etching process is difficult to control with accuracy, thus bosses of varying dimensions were often produced.

In addition, it was occasionally desirable to produce other microstructures within a semiconductor device. Examples of such other microstructures are holes and top and bottom side notches.

SUMMARY OF THE INVENTION

The present invention is a method for precision micromachining of semiconductor materials using standard semiconductor fabrication techniques to pattern doped regions which serve to define the geometries. The method includes the steps of: forming a structure including a first layer and a second layer, the first layer having a first conductivity type and first and second surfaces, the second layer having a second conductivity type and a third surface and being connected to the first layer at the first surface. Next, a first region is formed within the structure. Then, a portion of one of the surfaces is masked. Lastly, etching occurs at the masked surface. The first region may be formed at least in part in the layer to be etched.

The result of this method is a microstructure having precise dimensions since the size of the first region can be tightly controlled.

Further steps can include the formation of a second region within the first layer prior to formation of the second layer. The second region has the first conductivity type but a second conductivity level different than the first level. When the first layer is subsequently etched, the second region is dissolved and causes a thinning of the second layer.

Yet another enhancement to the process is the formation of a third region within the second layer. The third region has the first conductivity type. Upon etching of the first layer, the third region is etched causing a thinning or a hole in the second layer.

DETAILED DESCRIPTION OF THE PREFERRED EMBODIMENT

In the following description, like structures are identified with similar identification numbers.

Figure 1A:
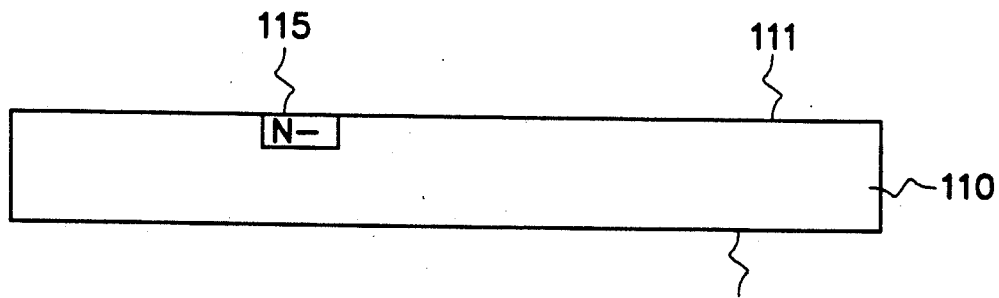
FIGS. 1A-C show the steps used to make a first microstructural element in a semiconductor device.
Figure 1B:
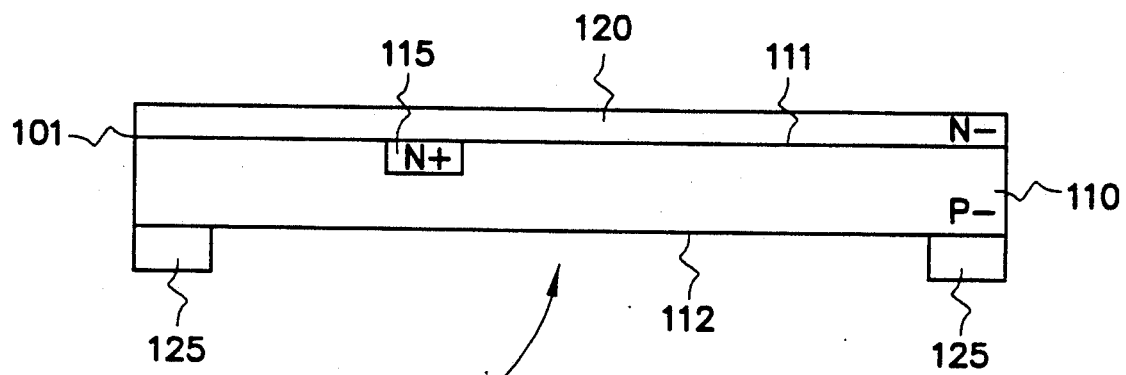
Figure 1C:
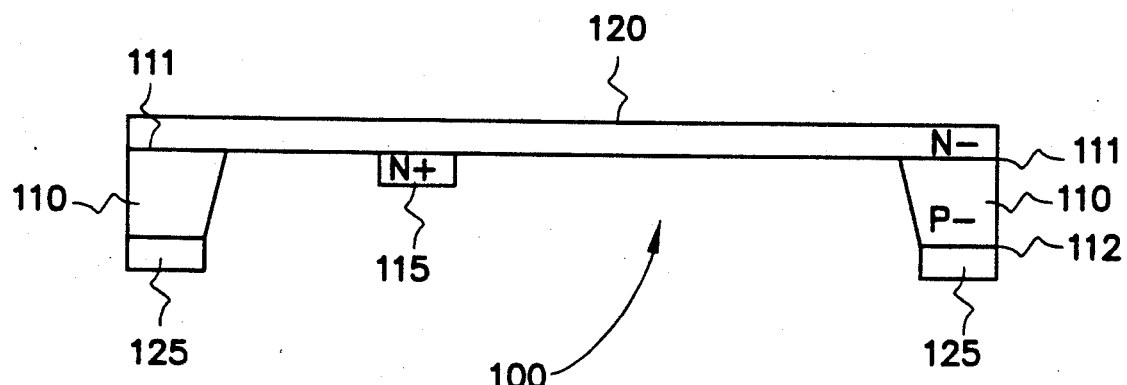

Referring now to FIGS. 1A-C, thereshown is a first microstructure 115 in a semiconductor device 100 formed using the inventive method. First, a first layer 100 having a first conductivity type and first conductivity level, and first and second surfaces 111, 112 is formed. Here, the first layer is formed of P− silicon. Next, the microstructure 115 is formed as a first region within the first layer 110 at surface 111. The microstructure is formed of material having a second conductivity type and a second doping level. Next, a second layer 120 is formed at the first surface 111 of material having the second conductivity type and a first doping level lower than the second doping level. Mask 125 is then placed on the second surface 112. An etchant (not shown) such as Potassium Hydroxide (KOH) is then exposed to the second surface 112. The etchant etches away the P− silicon until the device of FIG. 1C remains. Note that the etchant does not effect microstructure 115. This process can be used for example to make bosses on a pressure transducer diaphragm.

Figure 2A:
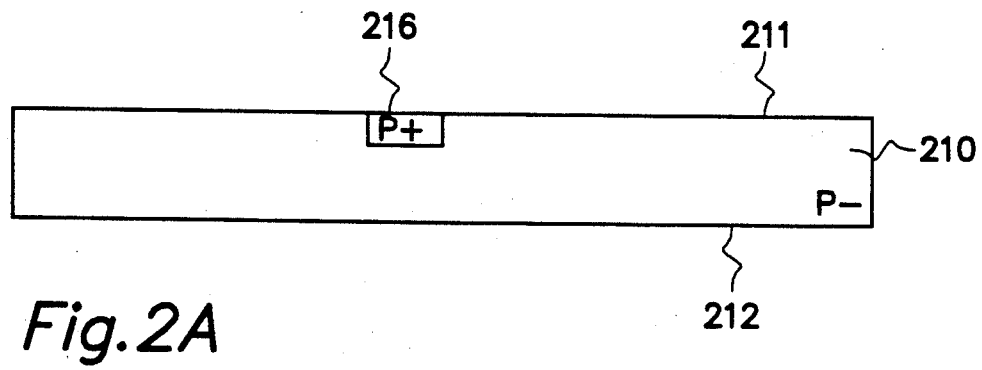
FIGS. 2A-C show the steps used to make a second microstructural element in a semiconductor device.
Figure 2B:
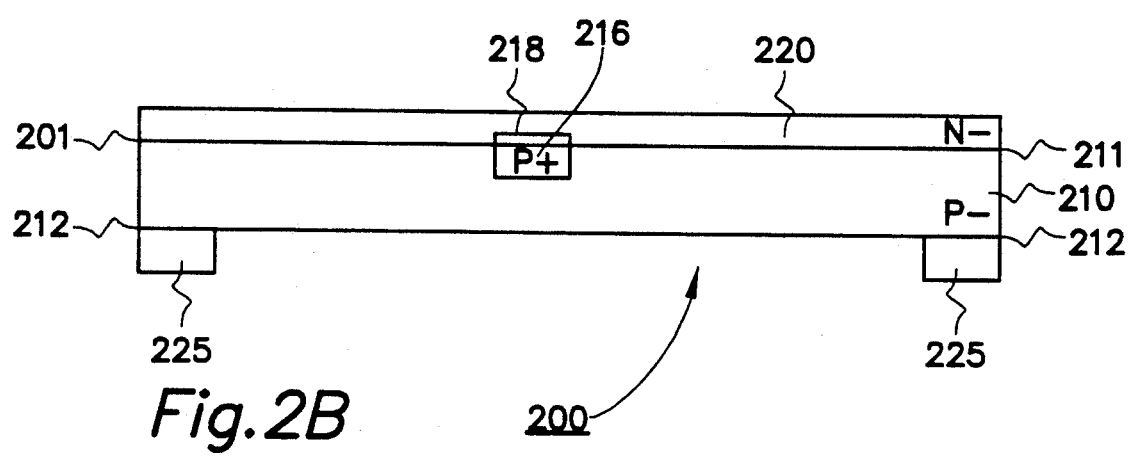
Figure 2C:
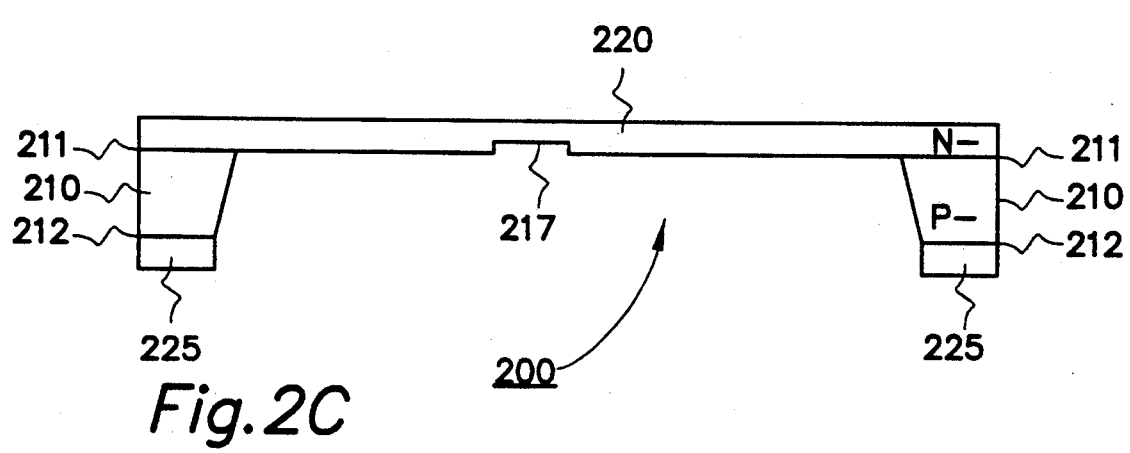

Turning now to FIGS. 2A-C thereshown is a second semiconductor device having a microstructure 217. Microstructure 217 is formed by forming a first layer 210 of material having first and second surfaces 211, 212, a first conductivity type and a first doping level (for example P− silicon). Next, a region 216 having the first conductivity type and a second doping level (for example P+ silicon) is formed in the first layer 210 at the first surface 211. Then, a second layer 220 is formed at the first surface 211. Region 216 of P+ material up diffuses into second layer 220 when heated and forms region 218. Mask 225 is then placed on the second surface 212 to define the area to be etched. Finally, the second surface 212 is exposed to an etchant and the semiconductor device 200 shown in FIG. 2C is thereby produced. Note that here, microstructure 217 is formed as a region of reduced thickness in the second layer.

Figure 3A:
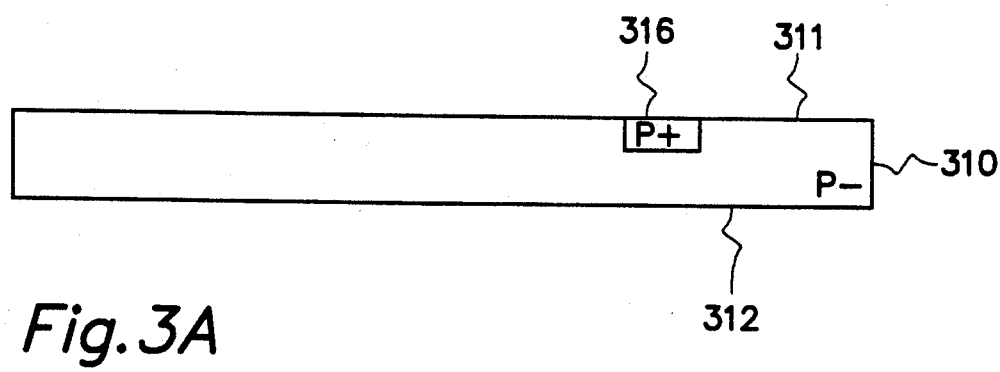
FIGS. 3A-C show the steps used to make a third microstructural element in a semiconductor device.
Figure 3B:
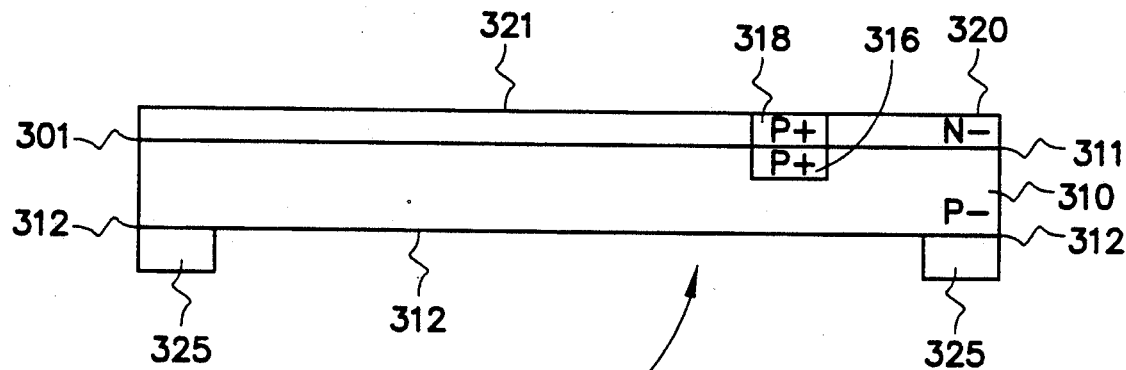
Figure 3C:
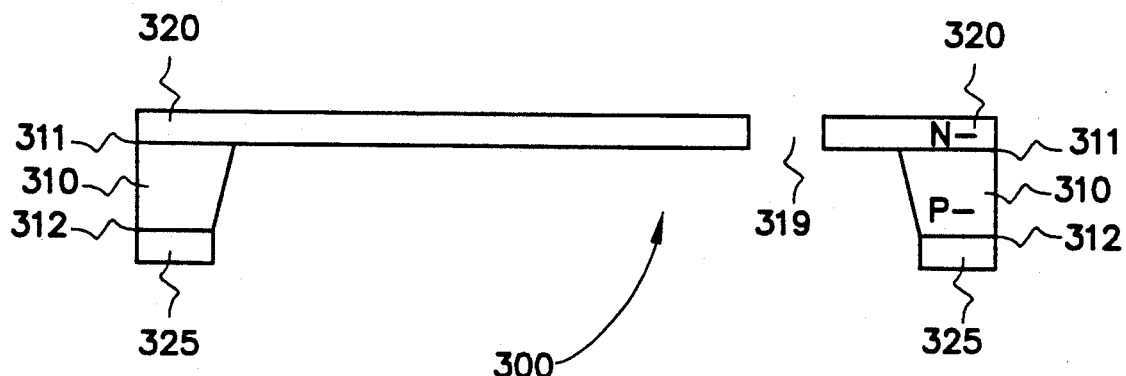

Referring now to FIGS. 3A-C, thereshown is a third embodiment of a semiconductor device 300 constructed using the presently inventive method. Microstructure 319 is formed by forming a first layer 310 having first and second surfaces 311, 312, a first conductivity type and first conductivity level (for example P− silicon). A first region 316 is then formed in the first layer 310 at the first surface 311 having a first conductivity type and a second conductivity level (for example P+ silicon). Next, a second layer 320, having a second conductivity type, is formed at the first surface 311. A second region 318 having the first conductivity type and the second doping level is then formed in the second layer aligned with the first region. Region 318 could be formed, for example, by depositing P+ material on the third surface 321 of layer 320, then heating the structure. The P+ deposition diffuses down into layer 320, and region 316 diffuses up into layer 320 to form region 318. Mask 325 is then placed on the second surface 312 to define an etch area. An etchant is then introduced to the second surface 312 and the semiconductor device 300 of FIG. 3C is thereby created. Note that microstructure 319 is a hole in an otherwise solid second layer. The hole can also be seen in FIG. 3F. The hole may be of any size and shape and depends mainly upon the area masked during formation of region 318.

Figure 3D:
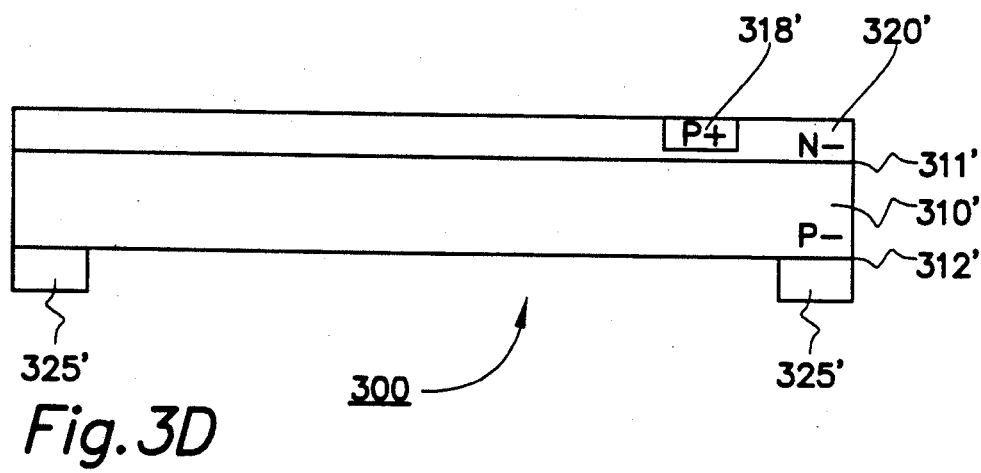
FIGS. 3D-E show the steps used to produce a topside notch.
Figure 3E:
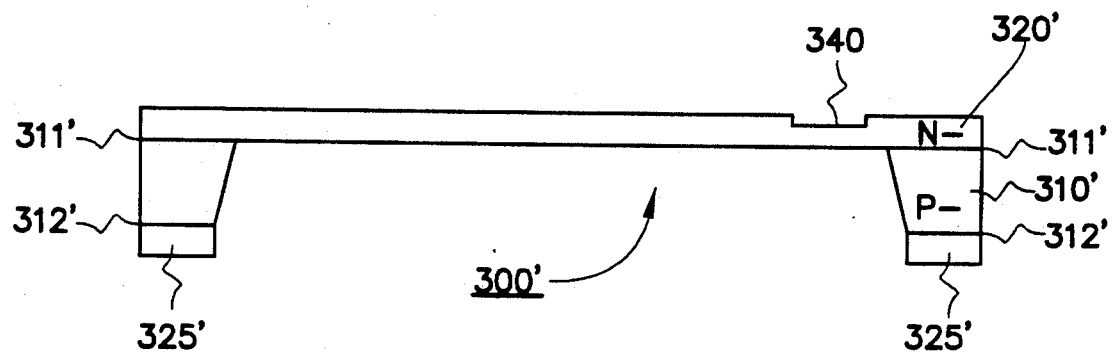
Figure 3F:
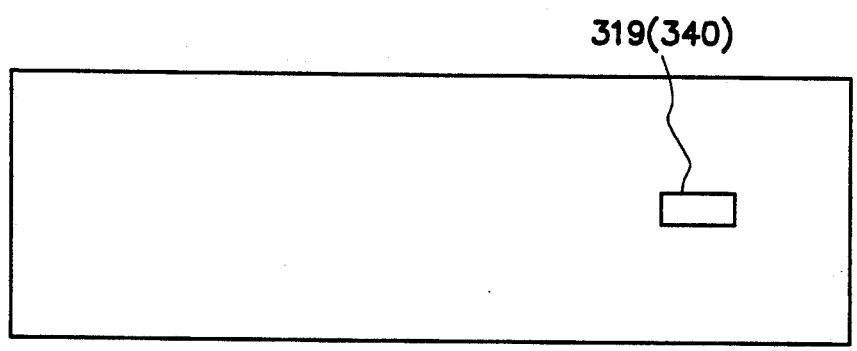
FIG. 3F is a top view of the structure formed either through the steps shown in FIGS. 3A-C or FIGS. 3D-E.

An alternative embodiment of the device shown in FIGS. 3A-C is shown in FIGS. 3D and 3E. The step shown in FIG. 3A is used to form the first layer 310' except that no first region 316 is formed in the first layer 310. Instead, the only region 318' formed within structure 300' is formed in second layer 320'. When structure 300' is etched, the device 300' shown in FIG. 3e is produced. Note that a notch 340 has been formed in the second layer 320'. FIG. 3f is also representative of the notch 340.

Many different semiconductor devices can be formed using the inventive method. For purposes of the following explanation, a pressure transducer will be described. However, the presently inventive method is useful in the construction of mass flow devices, accelerometers, and the like.

Figure 4A:
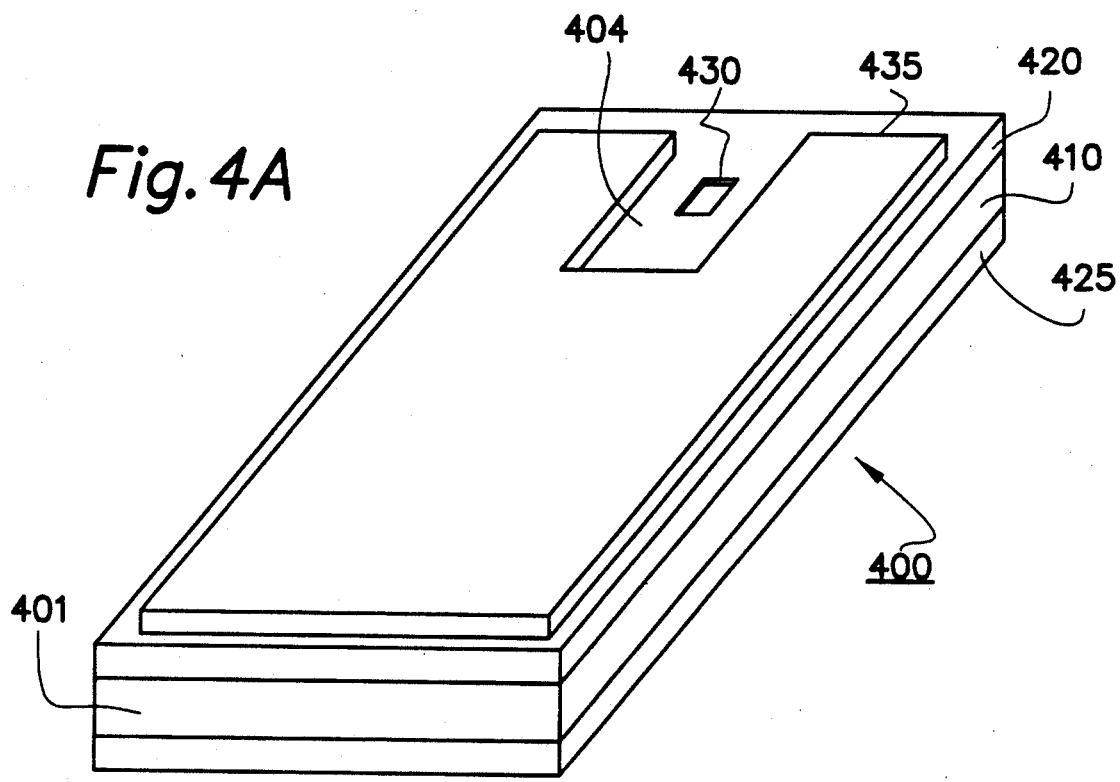
FIG. 4A shows a perspective view of a pressure sensor made from the inventive method.
Figure 4B:
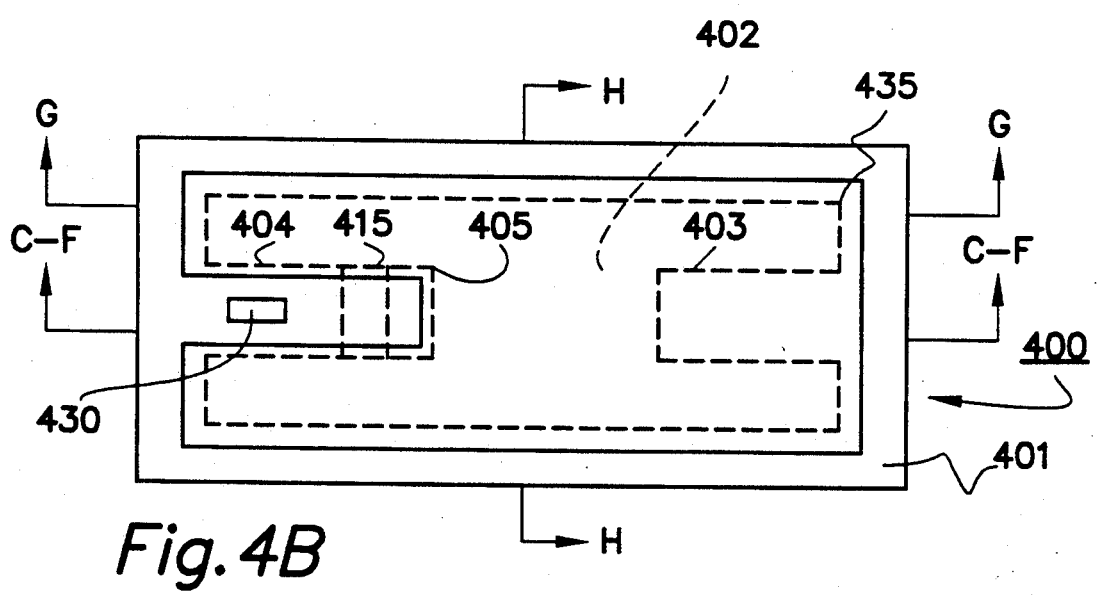
FIGS. 4B-F show the steps of making the pressure sensor using the steps of the inventive method.
Figure 4C:
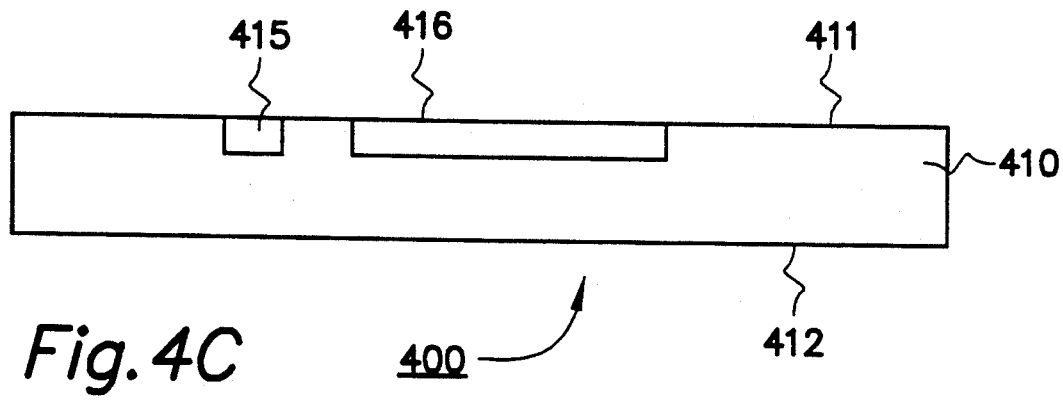
Figure 4D:
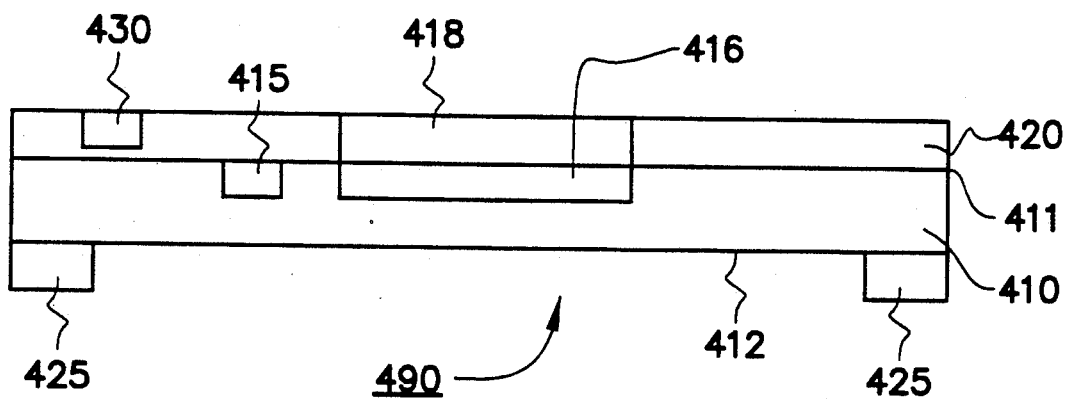
Figure 4E:
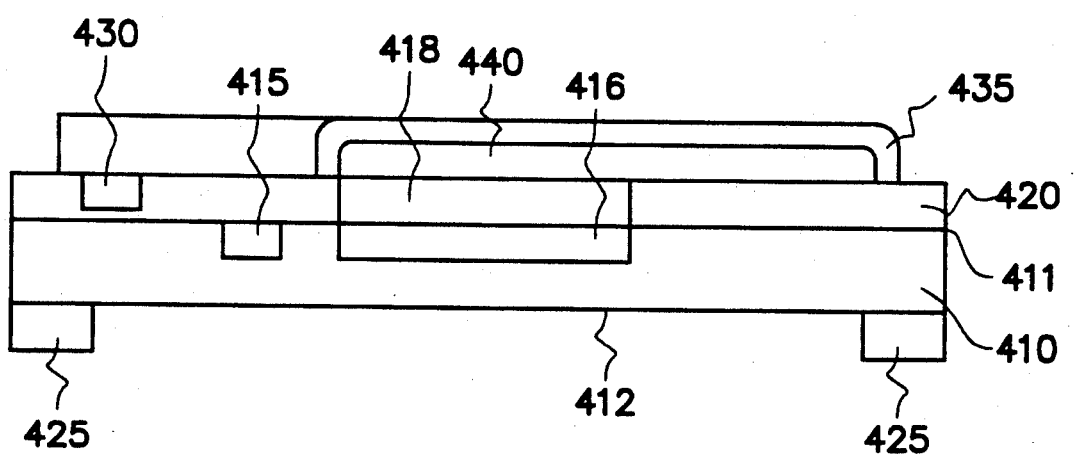

Turning now to FIG. 4B, thereshown is top view of a second pressure transducer 400 which includes support rim 401, rib 404, overpressure stop 403, cavity 402, resistor 430 and polysilicon diaphragm 435. Polysilicon diaphragm 435 is attached to rib 404 at region 405. Pressure transducer 400 operates by allowing a pressure to come into contact with this top side of polysilicon diaphragm 435. The pressure on the diaphragm in turn causes deflection of rib 404 which in turn causes a change in resistance in resistor 430.

FIG. 4A is a perspective view of the device shown in FIG. 4B.

FIGS. 4C-F show the steps of forming pressure transducer 400 as viewed along line C-F—C-F. Pressure transducer 400 starts as a first layer 410 of, for example, P− type silicon having first and second surfaces 411, 412. First region 415 is formed as a highly doped N+ region within the first layer by, for example, diffusion or ion implantation. Second region 416 is formed as a P+ region at first surface 411.

Second layer 420 is then formed at first surface 411 of, for example, N− type silicon. Third region 418 is then formed in the second layer 420 of, for example, highly doped P+ material aligned with the second region 416. Region 418 can be formed using, for example ion implantation or diffusion.

Next, a sacrificial oxide is formed at region 440 and a polysilicon diaphragm 435 is formed on the sacrificial oxide 440. As a final pre-etching step, mask 425 is placed on second surface 412 of first layer 410 to define the area to be etched.

The first layer 410 is then etched using, for example, an electrochemical etching process with KOH etchant.

Figure 4F:
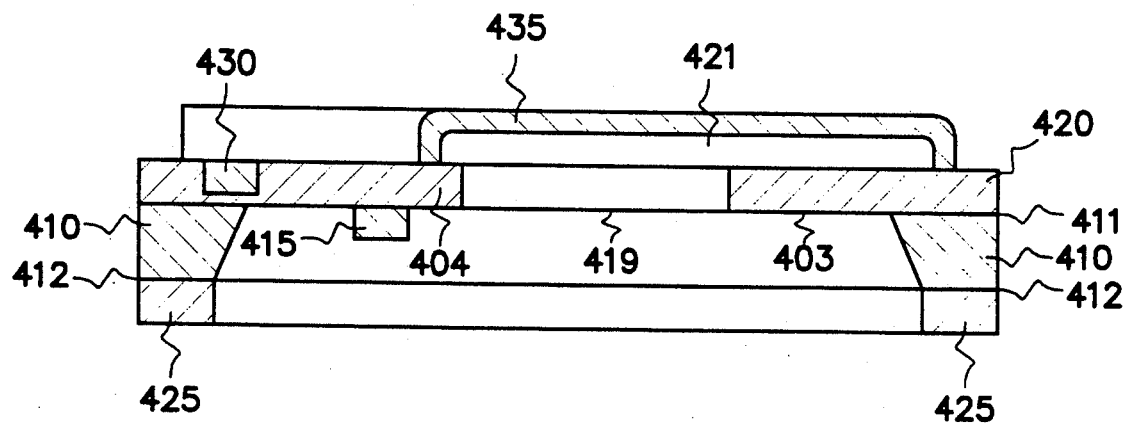

The etching results in the pressure transducer as shown in FIG. 4F. Note that region 418 and the sacrificial oxide 440 in FIG. 4E has been etched away with an oxide etch and results in a cavity 419 and 421 between the diaphragm and any remaining portions of the second layer 420. Also, boss 415 is left on the underside of rib 404.

Figure 4G:
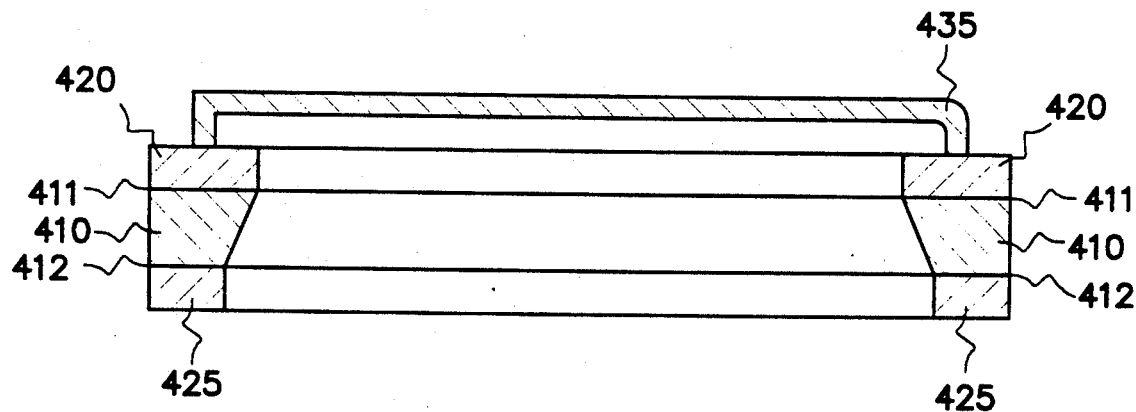
FIG. 4G shows a slice view taken along line G—G.
Figure 4H:
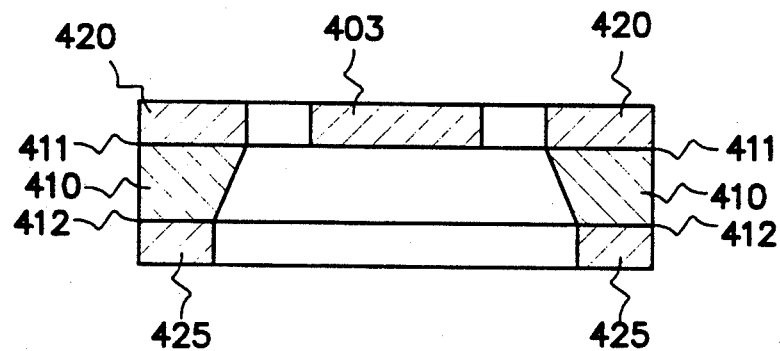
FIG. 4H shows a slice view taken along line H—H.

FIG. 4G shows a view of the pressure transducer of FIG. 4B taken along line G—G. FIG. 4H shows the the pressure transducer of FIG. 4B along line H—H.

Figure 5A:
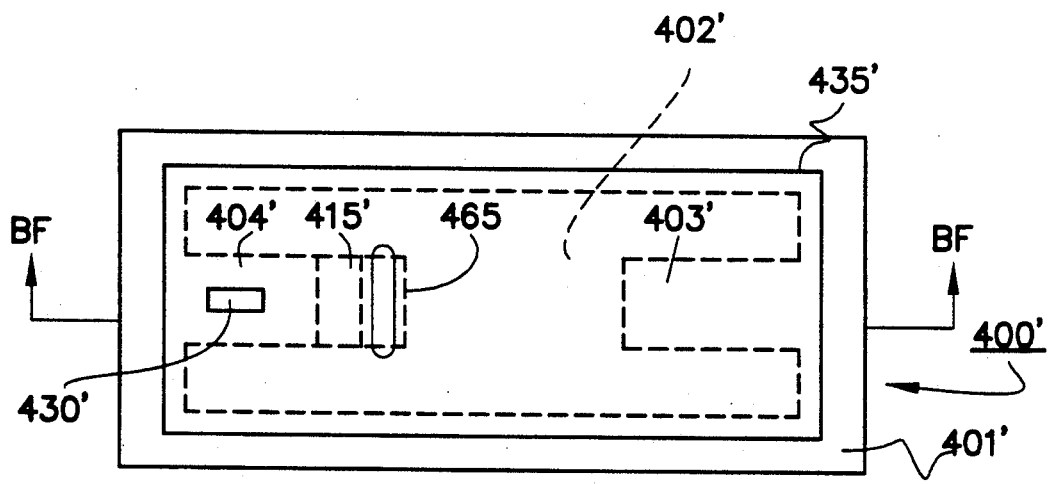
FIGS. 5A is a top view of a second pressure sensor made using the inventive method.
Figure 5B:
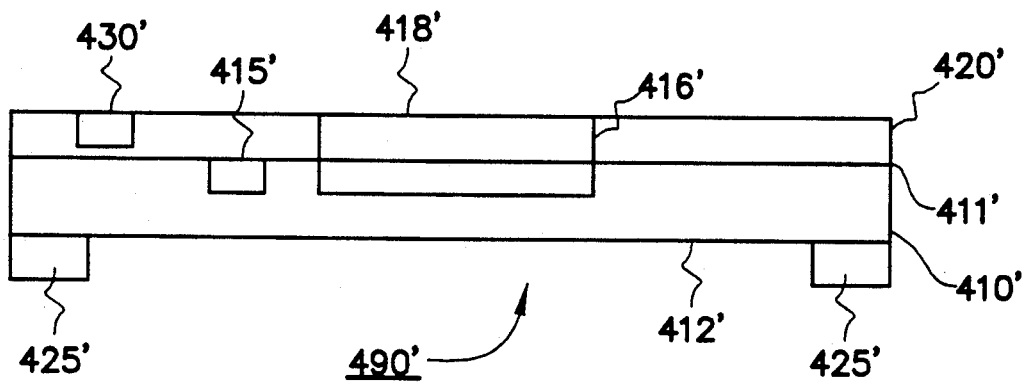
FIGS. 5B-E show a slice view of the steps of making the second pressure sensor along line B-F—B-F.

FIG. 5A shows a top view of a pressure transducer 400' which is similar to the pressure transducer depicted in FIGS. 4A-H. Structure 490' shown in FIG. 5B is formed using the same steps described with reference to FIGS. 4C and 4D.

Figure 5C:
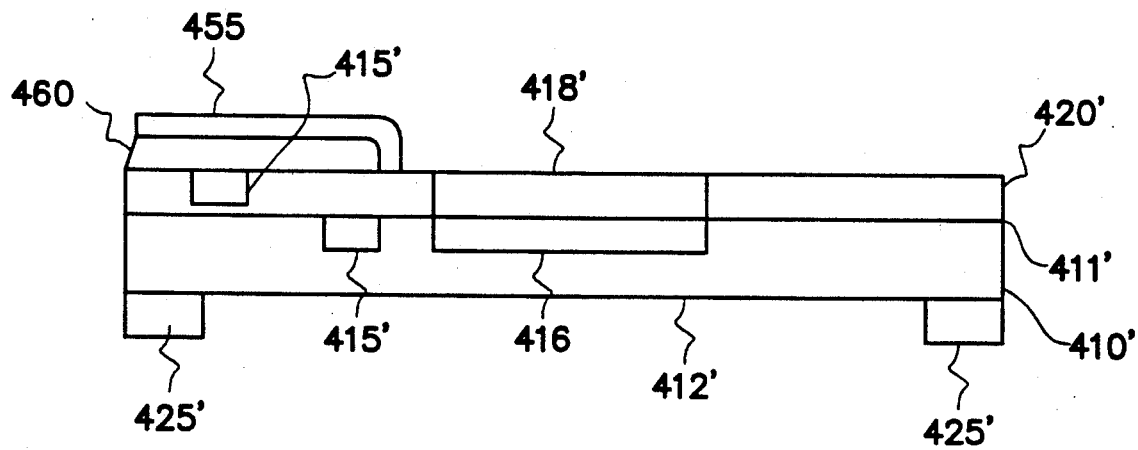

FIG. 5C shows the formation of a passivating oxide 460 on the resistive 430' and rib 404' regions. Then a first polysilicon layer 455 is placed over the passivating oxide 460.

Figure 5D:
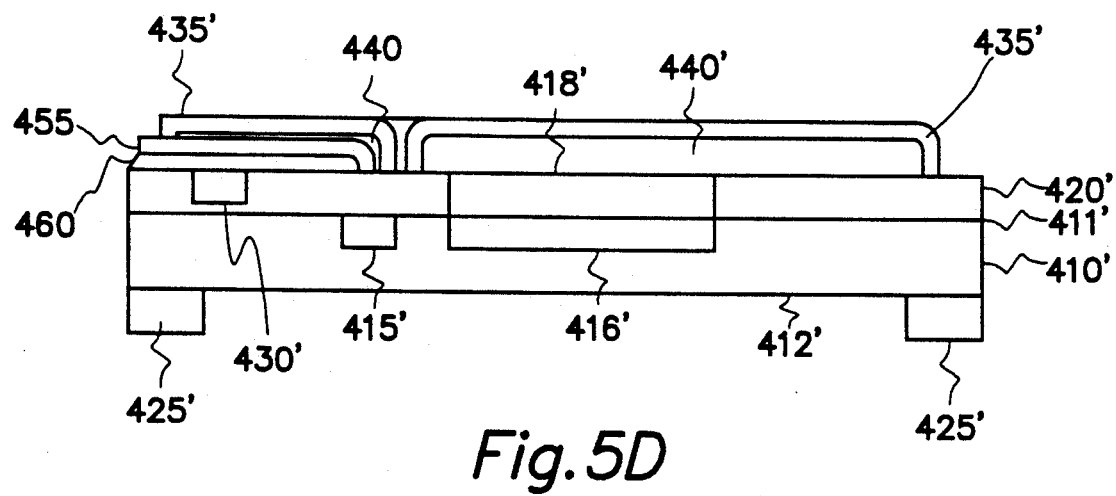
Figure 5E:
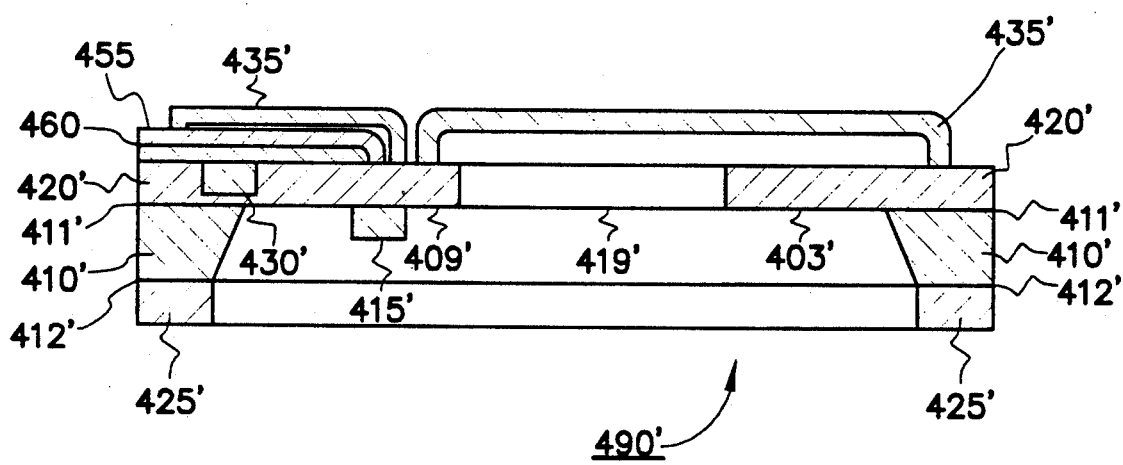
Figure 5F:
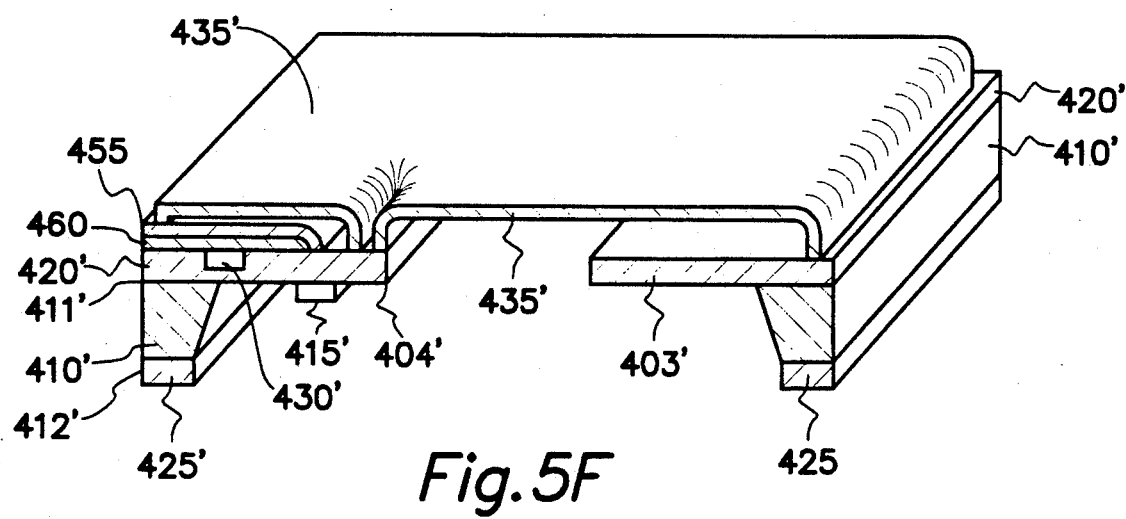
FIG. 5F is a perspective view of the sensor shown in FIG. 5E.

FIG. 5D then shows formation of a sacrificial oxide 440' over the first polysilicon layer 455 and the remaining portions of the third surface of structure 490'. Then a second polysilicon layer 435' (the diaphragm) is formed over the sacrificial oxide 440'. A first etch using for example KOH is then performed to etch away unmasked portions of the first layer 410' and to etch through the second layer 420'. A second etch using an oxide etchant is used to etch away the sacrificial oxide 440'. Passivating oxide 460 is not affected by either etch. The resulting device 400' is shown in FIG. 5E. A perspective view of the device shown in FIG. 5E is shown in FIG. 5F.

Examples of the doping levels for the various types of regions are $P+=5\times10^{18}/cm^3$, $N+=5\times10^{18}/cm^3$, $N-=2\times10^{16}/cm^3$ and $P-=2\times10^{15}/cm^3$.

The foregoing has been a description of a novel and non-obvious method for making a pressure transducer. The applicants do not intend to define the extent of their invention through the foregoing description, but instead define the limits of their invention through the following claims.

We claim:

1. A method of forming a pressure transducer, comprising the steps of:

forming a support member, said support member defining a cavity;

forming a rib connected to said support member extending into said cavity;

forming an electronic element in stress communicating relationship with said rib;

forming a diaphragm connected to said support member and said rib; and forming a boss connected to said rib.

2. The method of claim 1, comprising the further steps of:

forming a region of passivating oxide material on said rib over the electronic element; and extending said diaphragm over all of said rib.

3. The method of claim 1, comprising the further step of:

forming an overpressure stop region connected to said support member which extends into said cavity.

4. A method of forming a pressure transducer, comprising:

forming a first layer having first and second surfaces;

forming a first region at said first surface, said first region being of a different conductivity type than said first layer;

forming a second layer at said first surface;

forming a second region in said second layer, said second region being of a different conductivity type than said second layer, said first and second regions being generally aligned with each other;

forming a third layer of sacrificial material over said second layer in a predefined pattern, said second layer being disposed between said first and third layers;

forming a polysilicon diaphragm layer over said third layer and over portions of said second layer which are not covered by said third layer;

etching said first layer at said second surface to remove a portion of said first layer, said first and second regions and said third layer to provide a cavity between said second layer and said polysilicon diaphragm layer; and forming a piezoresistive component in stress communication with said polysilicon diaphragm layer.

5. The method of claim 4, wherein:

said first layer is made of P− type silicon, said first region is a P+ conductivity type material, said second layer is made of N− type silicon, said second region is a highly doped P+ material and said sacrificial material is an oxide.

6. The method of claim 4, wherein:

said first and second regions are shaped to define a rib extending from a peripheral rim as a result of said etching step.

7. The method of claim 4, wherein:

said predefined pattern is selected to provide a direct contact between said second layer and said polysilicon diaphragm layer at a region of said rib displaced from said rim.

8. The method of claim 7, wherein:

said piezoresistive component is formed in said rib.

* * * * *